United States Patent [19]

Fuentes, Jr.

[11] 4,456,547

[45] Jun. 26, 1984

[54] CATALYST PREPARED FROM ORGANOMAGNESIUM COMPOUND, ORGANIC HYDROXYL-CONTAINING COMPOUND, REDUCING HALIDE SOURCE AND COMPLEX FORMED FROM ADMIXTURE OF A TRANSITION METAL COMPOUND AND AN ORGANOZINC COMPOUND

[76] Inventor: Ricardo Fuentes, Jr., 12513 Parkciel Dr., Baton Rouge, La. 70816

[21] Appl. No.: 435,786

[22] Filed: Oct. 21, 1982

[51] Int. Cl.$^3$ ............................. C08F 4/62; C08F 4/64; C08F 4/68

[52] U.S. Cl. ................................. 502/117; 252/431 R; 526/124; 526/133; 526/142; 502/134

[58] Field of Search ........................ 252/429 B, 431 R

[56] References Cited

U.S. PATENT DOCUMENTS

| | | | |
|---|---|---|---|
| 3,094,568 | 6/1963 | Hay et al. | 252/429 B X |
| 3,644,318 | 2/1972 | Diedrich et al. | 260/88.2 |
| 3,901,863 | 8/1975 | Berger et al. | 260/88.2 |
| 3,951,935 | 4/1976 | Engelmann | 526/129 |
| 4,006,101 | 2/1977 | Matsuura et al. | 252/429 |
| 4,039,472 | 8/1977 | Hoff | 252/429 |
| 4,105,846 | 8/1978 | Hoff et al. | 526/124 |
| 4,115,319 | 9/1978 | Scata et al. | 252/429 |
| 4,187,385 | 2/1980 | Iwao et al. | 526/128 |
| 4,244,838 | 1/1981 | Gessell | 252/429 B |
| 4,246,383 | 1/1981 | Gessell | 252/429 C X |
| 4,250,286 | 2/1981 | Shipley | 526/125 |
| 4,269,733 | 5/1981 | Shipley | 252/429 |

FOREIGN PATENT DOCUMENTS

| | | |
|---|---|---|
| 7 | 6/1978 | European Pat. Off. . |
| 2758312 | 7/1978 | Fed. Rep. of Germany . |
| 51-111281 | 10/1976 | Japan . |
| 51-148785 | 12/1976 | Japan . |
| 762246 | 3/1977 | South Africa . |
| 1235062 | 6/1971 | United Kingdom . |
| 1306001 | 2/1973 | United Kingdom . |
| 1311013 | 3/1973 | United Kingdom . |
| 1539175 | 1/1979 | United Kingdom . |

*Primary Examiner*—Patrick Garvin

[57] ABSTRACT

A catalyst for polymerizing olefins is the product resulting from mixing in an inert hydrocarbon diluent a mixture of (A) an organomagnesium material, (B) an organic hydroxyl-containing material, (C) a reducing halide source and (D) the reaction product or complex formed from the admixture of a transition metal compound and an organozinc compound.

4 Claims, No Drawings

CATALYST PREPARED FROM ORGANOMAGNESIUM COMPOUND, ORGANIC HYDROXYL-CONTAINING COMPOUND, REDUCING HALIDE SOURCE AND COMPLEX FORMED FROM ADMIXTURE OF A TRANSITION METAL COMPOUND AND AN ORGANOZINC COMPOUND

BACKGROUND OF THE INVENTION

This invention relates to a new catalyst composition useful for initiating and promoting polymerization of one or more α-olefins and to a polymerization process employing such a catalyst composition.

It is well known that olefins such as ethylene, propylene, and 1-butene in the presence of metallic catalysts, particularly the reaction products of organometallic compounds and transition metal compounds can be polymerized to form substantially linear polymers of relatively high molecular weight. Typically such polymerizations are carried out at relatively low temperatures and pressures.

Among the methods for producing such linear olefin polymers, some of the most widely utilized are those described by Professor Karl Ziegler in U.S. Pat. Nos. 3,113,115 and 3,257,332. In these methods, the catalyst employed is obtained by admixing a compound of a transition metal of Groups 4b, 5b, 6b and 8 of Mendeleev's Periodic Table of Elements with an organometallic compound. Generally the halides, oxyhalides and alkoxides or esters of titanium, vanadium and zirconium are the most widely used transition metal compounds. Common examples of the organometallic compounds include the hydrides, alkyls and haloalkyls of aluminum, alkylaluminum halides, Grignard reagents, alkali metal aluminum hydrides, alkali metal borohydrides, alkali metal hydrides, alkaline earth metal hydrides and the like. Usually, the polymerization is carried out in a reaction medium comprising an inert organic liquid, e.g., an aliphatic hydrocarbon and the aforementioned catalyst. One or more olefins may be brought into contact with the reaction medium in any suitable manner, and a molecular weight regulator, such as hydrogen, is often added to the reaction vessel in order to control the molecular weight of the polymers. Such polymerization processes are either carried out at slurry polymerization temperatures (i.e., wherein the resulting polymer is not dissolved in the hydrocarbon reaction medium) or at solution polymerization temperatures (i.e., wherein the temperature is high enough to solubilize the polymer in the reaction medium).

Following polymerization, it is common to remove catalyst residues from the polymer by repeatedly treating the polymer with alcohol or other deactivating agent such as an aqueous basic solution. Such catalyst deactivation and/or removal procedures are expensive both in time and material consumed as well as the equipment required to carry out such treatment.

Gessell's U.S. Pat. Nos. 4,244,838 and 4,246,383 and pending applications Ser. No. 192,959 filed Oct. 1, 1980 and 192,960 filed Oct. 1, 1980 and now abandoned by Gessell, Gibbs and Fuentes, Jr., disclose catalysts prepared by employing an organic hydroxyl-containing material. However, such catalysts are directed only to the resultant solid reaction product which must be separated from the liquid portion and washed. It would be desirable to employ a catalyst which does not require the recovery of the solid reaction product and the attendant washing steps.

The present invention provides a catalyst for polymerizing α-olefins which catalysts are sufficiently efficient so as to not require their removal from the polymer and their preparation does not require recovery and washing of the solid reaction product nor is heating required to prepare the catalyst.

SUMMARY OF THE INVENTION

The present invention is directed to the catalytic product resulting from admixing in an inert hydrocarbon diluent and in an atmosphere which excludes moisture and oxygen (A) at least one hydrocarbon soluble organomagnesium material;
(B) at least one organic hydroxyl-containing material;
(C) at least one reducing halide source; and
(D) the reaction product or complex formed by mixing at a temperature and for a time sufficient to provide a color change
  (1) at least one transition metal (Tm) compound having at least one hydrocarbyloxy attached to said transition metal and
  (2) at least one organozinc compound; and wherein
    (a) the components are added in the order (A), (B), (C) and (D) or (A), (B), (D) and (C); and
    (b) the components are employed in quantities so as to provide the following atomic ratios
      Mg:Tm of from about 0.1:1 to about 100:1, preferably from about 1:1 to about 40:1 and most preferably from about 5:1 to about 20:1;
      Zn:Tm of from about 0.05:1 to about 10:1, preferably from about 0.1:1 to about 5:1 and most preferably from about 0.2:1 to about 2:1
      Cl:Mg of from about 2:1 to about 20:1, preferably from about 3:1 to about 15:1 and most preferably from about 4:1 to about 10:1; and
      the OH:total number of hydrocarbyl groups attached to a metal atom in component (A) is from about 0.5:1 to about 1.5:1 and preferably from about 0.8:1 to about 1.2:1.

A further aspect of the invention is a process for polymerizing α-olefins or mixtures thereof which comprises conducting the polymerization in the presence of the aforementioned catalysts.

DESCRIPTION OF THE PREFERRED EMBODIMENTS

The organomagnesium materials which are suitably employed in the present invention include those represented by the formula $R_2Mg \cdot xMeR'_{x'}$ wherein each R is independently a hydrocarbyl group and each R' is independently a hydrogen, hydrocarbyl or hydrocarbyloxy group, Me is Al, Zn or B, x has a value from 0 to 10 and x' has a value equal to the valence of Me.

The term hydrocarbyl as employed herein refers to a monovalent hydrocarbon group such as alkyl, cycloalkyl, aryl, aralkyl, alkenyl and similar hydrocarbon groups having from 1 to about 20 carbon atoms with alkyl having from 1 to 10 carbon atoms being preferred.

The term hydrocarbyloxy as employed herein refers to monovalent oxyhydrocarbon group such as alkoxy, cycloalkoxy, aryloxy, aralkoxy, alkenoxy and similar oxyhydrocarbon groups having from 1 to about 20 carbon atoms with alkoxy groups having from 1 to 10 carbon atoms being the preferred hydrocarbyloxy groups.

The quantity of MeR′$_{x'}$, i.e. the value of x, is preferably the minimum amount which is sufficient to render the magnesium compound soluble in the inert solvent or diluent which is usually a hydrocarbon or mixture of hydrocarbons. The value of x therefore is from zero to about 10, usually from about 0.2 to about 2.

Particularly suitable organomagnesium compounds include, for example, di-(n-butyl) magnesium, n-butyl-sec-butyl magnesium, diisopropyl magnesium, di-n-hexyl magnesium, isopropyl-n-butyl magnesium, ethyl-n-hexyl magnesium, ethyl-n-butyl magnesium, di-(n-octyl) magnesium, butyl octyl magnesium and such complexes as di-n-butyl magnesium.½aluminum triethyl, di-(n-butyl) magnesium.1/6aluminum triethyl, dibutylmagnesium.½triisobutylaluminum, butylethylmagnesium.½triisobutylaluminum, butylethylmagnesium.¼ triisobutylaluminum, di-n-hexylmagnesium.½ triisobutylaluminum, mixtures thereof and the like.

Suitable hydroxyl-containing organic compounds include, for example, alcohols, glycols, polyoxyalkylene glycols, mixtures thereof and the like.

Suitable such compounds include those represented by the formulas

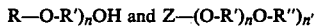
R—O-R′)$_n$OH and Z—(O-R′)$_n$O-R″)$_{n'}$ wherein each R is a hydrocarbyl group having from 1 to about 20, preferably from 1 to about 10, carbon atoms; each R′ is independently a divalent hydrocarbyl group having from 1 to about 20, preferably from 1 to about 10, carbon atoms; each R″ is independently hydrogen or a hydrocarbyl group having from 1 to about 20, preferably from 1 to about 10, carbon atoms, at least one of which is hydrogen; Z is a multivalent organic group containing from 2 to about 20 carbon atoms; n has a value from zero to about 10; and n′ has a value of from 2 to about 10.

Particularly suitable organic hydroxyl-containing compounds include alcohols such as for example methyl alcohol, ethyl alcohol, n-propyl alcohol, isopropyl alcohol, n-butyl alcohol, sec-butyl alcohol, tert-butyl alcohol, octyl alcohol, octadecyl alcohol, glycols, 1,2-butylene glycol, 1,3-propylene glycol, 1,4-butanediol, 1,6-hexane diol, other hydroxyl containing compounds such as, for example, glycerine, trimethylol propane, hexane triol, phenol, 2,6-di-tert-butyl-4-methylphenol, mixtures thereof and the like. Also suitable are the adducts of ethylene oxide, 1,2-propylene oxide, 1,2-butylene oxide, 2,3-butylene oxide, styrene oxide or mixtures of such oxides with the previously mentioned or other hydroxyl-containing compounds such as pentaerythritol, sucrose, sorbitol and the like, as well as the alkyl and aryl capped hydroxyl-containing compounds so long as there remains at least 1 hydroxyl group per molecule.

Suitable reducing halide sources include those represented by the formulas

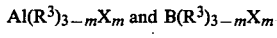
Al(R$^3$)$_{3-m}$X$_m$ and B(R$^3$)$_{3-m}$X$_m$ including mixtures thereof wherein each R$^3$ is independently hydrogen or a hydrocarbyl group as hereinbefore defined, X is a halogen, and m has a value from 1 to 2.

Particularly suitable reducing halides include, for example, ethylaluminum dichloride, diethylaluminum chloride, ethylaluminum sesquichloride, ethylboron dichloride, diethylboron chloride, mixtures thereof and the like.

Suitable zinc compounds which can be advantageously employed are those represented by the formulae R$_2$Zn or RZnX wherein each R is independently a hydrocarbyl group having from 1 to about 20, preferably from 1 to about 10, carbon atoms and X is a halogen, preferably chlorine or bromine. Particularly suitable zinc compounds include, for example, diethyl zinc, diphenyl zinc, ethyl zinc chloride, mixtures thereof and the like.

Suitable transition metal compounds which can be employed include those represented by the formulae Tm(OR″)$_n$X$_{z-n}$ or Tm(OR″)$_2$O, wherein Tm is a transition metal in its highest stable valence state and being selected from groups IV-B, V-B and VI-B of the Periodic Table of the Elements; each R″ is a hydrocarbyl group having from 1 to about 20, preferably from 1 to about 10, carbon atoms; X is a halogen, preferably chlorine or bromine; z has a value corresponding to the valence of the transition metal, Tm; n has a value of from one to the valence state of the transition metal, Tm.

Particularly suitable transition metal compounds include, for example, tetraethoxytitanium, tetraisopropoxytitanium, tetra-n-propoxytitanium, tetra-n-butoxytitanium, tetra-(2-ethylhexoxy)titanium, tetraphenoxytitanium, tetrabutoxyzirconium, tri-n-butoxy vanadium oxide, tri-isopropoxy vanadium oxide, zirconium tetra-n-propoxide, zirconium tetraisopropoxide, mixtures thereof and the like.

When preparing the catalysts, it is particularly advantageous to employ the organozinc:transition metal complex in a pre-mixed form. The pre-mix is most advantageously formed by the addition of one compound to the other, in no particular order, in a hydrocarbon solvent. Typical commercially available organozinc compounds are dissolved in hydrocarbon solvent. The concentration of the components and temperature of mixing determine the time necessary for a distinct color change. The color change varies depending on the particular components employed.

Suitable organic inert diluents in which the catalyst can be prepared and in which the α-olefin polymerization can be conducted include, for example, liquefied ethane, propane, isobutane, n-butane, isopentane, n-pentane, n-hexane, the various isomeric hexanes, isooctane, paraffinic mixtures of alkanes having from 8 to 12 carbon atoms, cyclohexane, methylcyclopentane, dimethylcyclohexane, dodecane, eicosane industrial solvents composed of saturated or aromatic hydrocarbons such as kerosene, naphthas, etc., especially when freed of any olefin compounds and other impurities, and especially those hving boiling points in the range from about −50° to about 200° C. Also included as suitable inert diluents are benzene, toluene, ethylbenzene, cumene, decalin and the like.

Suitable cocatalysts or activators with which the catalysts of the present invention can be reacted, contacted or employed in the polymerization of α-olefins includes those aluminum, boron, zinc or magnesium compounds represented by the formulas Al(R$^3$)$_{3-a}$X′$_a$, B(R$^3$)$_{3-a}$X′$_a$, MgR$^3$$_2$, MgR$^3$X′, ZnR$^3$$_2$ or mixtures thereof wherein R$^3$ is as previously defined; X′ is a halogen, preferably chlorine or bromine; and a has a value of from zero to 2, preferably zero to 1 and most preferably zero.

Particularly suitable cocatalysts or activators include, for example, diethylaluminum chloride, ethylaluminum dichloride, diethylaluminum bromide, triethylaluminum, triisobutylaluminum, tri-n-octylaluminum, diethylzinc, dibutylmagnesium, butylethylmagnesium, butylmagnesium chloride, diisobutylaluminum hydride, isoprenylaluminum, triethylboron, trimethylaluminum, mixtures thereof and the like.

The cocatalysts or activators are employed in quantities such that the atomic ratio of the Al, B, Mg, Zn or mixtures thereof to TM is from about 0.1:1 to about 1000:1, preferably from about 5:1 to about 500:1 and most preferably from about 10:1 to about 200:1.

The catalyst and cocatalyst or activator may be added separately to the polymerization reactor or they may be mixed together prior to addition to the polymerization reactor.

Olefins which are suitably homopolymerized or copolymerized in the practice of this invention are generally any one or more of the aliphatic α-olefins such as, for example, ethylene, propylene, butene-1, pentene-1, 3-methylbutene-1, 4-methylpentene-1, hexene-1, octene-1, dodecene-1, octadecene-1, 1,7-octadiene and the like. It is understood that α-olefins may be copolymerized with one or more other α-olefins and/or with small amounts i.e., up to about 25 weight percent based on the polymer of other polymerizable ethylenically unsaturated monomers such as styrene, α-methylstyrene and similar ethylenically unsaturated monomers which do not destroy conventional Ziegler catalysts. Most benefits are realized in the polymerization of aliphatic α-monoolefins, particularly ethylene and mixtures of ethylene and up to 50 weight percent, especially from about 0.1 to about 40 weight percent of propylene, butene-1, hexene-1, octene-1, 4-methylpentene-1, 1,7-octadiene or similar α-olefin or α-diolefin based on total monomer.

In the polymerization process employing the aforementioned catalytic reaction product, polymerization is effected by adding a catalytic amount of the catalyst composition to a polymerization zone containing α-olefin monomer, or vice versa. The polymerization zone is maintained at temperatures in the range from about 0° to about 300° C., preferably at slurry polymerization temperatures, e.g., from about 0° to about 95° C., more preferably from about 50° to about 90° C., for a residence time of from about 15 minutes to about 24 hours, preferably from about 30 minutes to about 8 hours. It is generally desirable to carry out the polymerization in the absence of moisture and oxygen and a catalytic amount of the catalytic reaction product is generally within the range from about 0.0001 to about 0.1 milligram-atoms transition metal per liter of diluent. It is understood, however, that the most advantageous catalyst concentration will depend upon polymerization conditions such as temperature, pressure, diluent and presence of catalyst poisons and that the foregoing range is given to obtain maximum catalyst yields. Generally in the polymerization process, a carrier which may be an inert organic diluent or excess monomer is generally employed. In order to realize the full benefit of the high efficiency catalyst of the present invention care must be taken to avoid oversaturation of the diluent with polymer. If such saturation occurs before the catalyst becomes depleted, the full efficiency of the catalyst is not realized. For best results, it is preferred that the amount of polymer in the carrier not exceed about 50 weight percent based on the total weight of the reaction mixture.

It is understood that inert diluents employed in the polymerization recipe are suitable as defined hereinbefore.

The polymerization pressures preferably employed are relatively low, e.g., from about 10 to about 500 psig. However, polymerization within the scope of the present invention can occur at pressures from atmospheric up to pressures determined by the capabilities of the polymerization equipment. During polymerization it is desirable to agitate the polymerization recipe to obtain better temperature control and to maintain uniform polymerization mixtures throughout the polymerization zone.

Hydrogen is often employed in the practice of this invention to control the molecular weight of the resultant polymer. For the purpose of this invention, it is beneficial to employ hydrogen in concentrations ranging from about 0 to about 80 volume percent in the gas or liquid phase in the polymerization vessel. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst. Using the general method described, the polymerization reactor may be operated liquid full or with a gas phase and at solution or slurry polymerization conditions.

The monomer or mixture of monomers is contacted with the catalytic reaction product in any conventional manner, preferably by bringing the catalyst composition and monomer together with intimate agitation provided by suitable stirring or other means. Agitation can be continued during polymerization. In the case of more rapid reactions with more active catalysts, means can be provided for refluxing monomer and solvent, if any of the latter is present and thus remove the heat of reaction. In any event, adequate means should be provided for dissipating the exothermic heat of polymerization, e.g., by cooling reactor walls, etc. If desired, the monomer can be brought in the vapor phase into contact with the catalytic reaction product, in the presence or absence of liquid material. The polymerization can be effected in a batch manner, or in a continuous manner, such as, for example, by passing the reaction mixture through an elongated reaction tube which is contacted externally with suitable cooling medium to maintain the desired reaction temperature, or by passing the reaction mixture through an equilibrium overflow reactor or a series of the same.

The polymer is readily recovered from the polymerization mixture by driving off unreacted monomer and solvent if any is employed. No further removal of impurities is required. Thus, a significant advantage of the present invention is the elimination of the catalyst residue removal steps. In some instances, however, it may be desirable to add a small amount of a catalyst deactivating reagent. The resultant polymer is found to contain insignificant amounts of catalyst residue.

The following examples are given to illustrate the invention, and should not be construed as limiting its scope. All parts and percentages are by weight unless otherwise indicated.

In the following examples, the melt index value $I_2$ was determined by ASTM D 1238 condition E. The apparent bulk density was determined as an unsettled bulk density according to the procedure of ASTM 1895 employing a paint volumeter from the Sargent-Welch Scientific Company (catalog no. S-64985) as the cylinder instead of the one specified by the ASTM procedure.

GENERAL PROCEDURE

In each of the following examples, unless otherwise stated, the catalyst components were blended while in a gloved box filled with dry oxygen-free nitrogen.

In the examples, the dibutylmagnesium was a commercial material obtained as a solution in a heptanehexane mixture from the Lithium Corporation of America, and the butylethylmagnesium was a commercial material obtained as a heptane solution from Texas Alkyls, Inc. All ratios are molar ratios unless otherwise indicated. The 1.53 molar ethylaluminum dichloride, 0.616 molar triisobutylaluminum and 0.921 molar triethylaluminum were obtained as solutions in hexane from Ethyl Corporation or Texas Alkyls, Inc.

EXAMPLE 1

A. Catalyst Preparation

To a stirred 500 ml container were added sequentially 32.5 ml of 0.769 molar dibutylmagnesium (25.0 mmoles), 20.3 ml of 0.616 molar triisobutylaluminum (ATB) (12.5 mmoles), and 7.0 ml of neat n-propyl alcohol (93.1 mmoles). The alcohol was added at a rate so as to maintain temperature at about 40°–50° C. A clear colorless solution resulted. The solution was cooled to 18° C. and then 34.0 ml of 1.53 molar ethylaluminum dichloride (EADC) (52.0 mmoles) were added dropwise so as to maintain temperature at about 18°–20° C., resulting in a white slurry. This was followed by the dropwise addition at 20° C. of a pre-mixed solution containing 2.3 ml of 1.08 molar diethylzinc (DEZ) (2.48 mmoles) and 1.5 ml of tetraisopropoxytitanium (4.98 mmoles). The DEZ:titanium mixture was pre-mixed one hour (3600 s) prior to use. The addition of the DEZ:titanium pre-mix resulted in a catalyst slurry which was tan-gold in color. The atomic ratios of Mg:Ti, Cl:Mg, and Zn:Ti were 5:1, 4.2:1, and 0.5:1, respectively. The molar ratio of alcohol to alkyl groups attached to magnesium and aluminum was 1.06:1.

B. Polymerization of Ethylene

To a stirred 1.0 liter reactor containing 600 ml of dry, oxygen free hexane were added (under nitrogen purge) 2.4 ml of 0.921 M triethylaluminum (ATE) (2.210 mmoles) and an aliquot of catalyst, prepared in A above, containing 0.0112 mmoles titanium. The ratio of cocatalyst Al:Ti was 197:1. The reactor was sealed and the nitrogen removed. The reactor contents were adjusted to 85° C. and hydrogen added such that the total pressure of the reactor was 70 psig (482.6 kPa).

Then ethylene was added to the reactor and was used to maintain the reactor at 170 psig (1172.1 kPa) total pressure for 2 hours (7200 s). The reactor was cooled, the seal broken, and the contents removed. The contents were filtered and dried in a vacuum oven at 60° C. The polyethylene obtained weighed 244 grams, had a bulk density of 20.2 lb/ft$^3$ (0.324 g/cc), and a melt index, $I_2$, of 3.6. The catalyst efficiency was 454,000 g PE/g Ti.

C. Polymerization of Ethylene

A polymerization of ethylene was made according to the procedure of 1-B, except that triisobutylaluminum (ATB) was substituted for triethylaluminum (ATE) as cocatalyst. 2.4 ml of 0.616 M ATB (1.478 mmoles) and an aliquot of catalyst 1-A containing 0.0144 mmoles titanium were used. The cocatalyst Al:Ti ratio was 103:1. The dried polyethylene weighed 154 g, had a melt index of 0.9, and a bulk density of 19.1 lb/ft$^3$ (0.306 g/cc). Catalyst efficiency was 223,000 g PE/g Ti.

EXAMPLE 2

A. Catalyst Preparation

To 39.2 ml (25.0 mmoles) of 0.637 M of butylethylmagnesium in heptane were added sequentially 20.3 ml (12.5 mmoles) of 0.616 M triisobutylaluminum in hexane, and 6.5 ml (87.5 mmoles) of n-propyl alcohol. The temperature of alcohol addition was about 40° C. The resultant clear, colorless solution was cooled to 20° C., and then 32.7 ml (50 mmoles) of 1.53 M ethylaluminum dichloride in hexane were added dropwise so as to maintain temperature at 25° C. A white solid formed after the addition of ethylaluminum dichloride. Then 5 ml of a pre-mixed 0.5 M hexane solution of diethylzinc and tetraisopropyltitanate, containing 2.5 mmoles of tetraisopropoxytitanium and 2.5 mmoles of diethylzinc, were added dropwise. The solids color changed to tan, and a small exotherm to 27° C. was noted. The final atomic ratios in the catalyst were Cl:Mg=4:1, Mg:Ti=10:1, Zn:Ti=1:1. The molar ratio of alcohol to R groups attached to magnesium and aluminum was 1:1.

B. Polymerization of Ethylene

The polymerization was done according to the method of example 1-B, except that 2.0 ml of 0.600 M triethylaluminum (1.20 mmoles) and an aliquot of catalyst A prepared above containing 0.00585 mmoles of titanium were used in a 2.8 liter reactor containing 1.6 liter of dry, oxygen-free hexane. The ratio of cocatalyst Al:Ti was 200:1. The dried reactor contents weighed 346 g. The melt index, $I_2$, of the polyethylene was 5.4, and the bulk density of the powder was 24.3 lb/ft$^3$ (0.389 g/cc). The catalyst efficiency was 1,232,000 g PE/g Ti.

COMPARATIVE EXPERIMENT A a. Catalyst Preparation

A catalyst was prepared according to the manner of example 2-A, except that no n-propyl alcohol was used in the preparation of the catalyst. The catalyst was prepared with the sequential addition of 25 mmoles of butylethylmagnesium, 12.5 mmoles triisobutylaluminum, 50 mmoles of ethylaluminum dichloride, and a pre-mixed hexane solution containing 2.5 mmoles of diethylzinc and 2.5 mmoles of tetraisopropoxytitanium. The atomic ratios of Cl:Mg, Mg:Ti, and Zn:Ti were 4:1, 10:1, and 1:1, respectively.

b. Polymerization of Ethylene

Ethylene was polymerized in the manner of example 2-B, except that 0.8 ml of 0.600 M triethylaluminum (0.48 mmoles) and an aliquot of catalyst (A-a) containing 0.0024 mmoles of titanium were used. The atomic ratio of cocatalyst Al:Ti was 200:1. The dried reactor contents weighed 59 grams. The melt index, $I_2$, of the polyethylene was 1.7, and the bulk density was 13.7 lb/ft³ (0.219 g/cc). The catalyst efficiency was 512,000 g PE/g Ti.

COMPARATIVE EXPERIMENT B a. Catalyst Preparation

A catalyst was prepared according to the method of example 2-A, except that no triisobutylaluminum and no n-propyl alcohol were used. The catalyst was prepared using the sequential addition of 25.0 mmoles of butylethylmagnesium, 50 mmoles of ethylaluminum dichloride, and a pre-mixed hexane solution containing 2.5 mmoles of diethylzinc and 2.5 mmoles of tetraisopropoxytitanium. The atomic ratios of Cl:Mg, Mg:Ti, and Zn:Ti were 4:1, 10:1, and 1:1, respectively.

b. Polymerization of Ethylene

Ethylene was polymerized according to the manner of example 2-B, except that 1.2 ml of 0.600 M triethylaluminum (0.72 mmoles) and an aliquot of catalyst (B-a) containing 0.0035 mmoles of titanium were used. The cocatalyst Al:Ti ratio was 205:1. The dried reactor contents weighed 143 grams. Melt index, $I_2$, of the polyethylene was 1.60, and the bulk density of the polyethylene powder was 14.2 lb/ft³ (0.227 g/cc). The catalyst efficiency was 851,000 g PE/g Ti.

EXAMPLE 3

A. Catalyst Preparation

In the manner of example 1-A, a catalyst was prepared by the sequential addition of 78.5 ml of 0.637 M butylethylmagnesium (50.0 mmoles) in hexane, 40.6 ml of 0.616 M triisobutylaluminum (25.0 mmoles) in hexane, 14.5 ml of n-propyl alcohol (192.8 mmoles), and the dropwise addition of 65.3 ml of 1.53 M ethylaluminum dichloride (99.9 mmoles) in hexane. A white slurry resulted after addition of ethylaluminum dichloride. Then the total catalyst slurry was split into two equal portions by volume, each containing 25 mmoles of magnesium. To one of the portions was added hexane solution (mixed 2 hours (7200 s) prior to use) containing 1.25 mmoles diethylzinc and 1.31 mmoles of tetraisopropoxytitanium. The final catalyst color changed to tan-brown. The atomic ratios of Mg:Ti, Cl:Mg, and Zn:Ti were 19.1:1, 4:1, and 0.95:1, respectively. The molar ratio of alcohol to alkyl groups attached to magnesium and aluminum was 1.10:1.

B. Polymerization of Ethylene

Ethylene was polymerized according to the manner of example 2-B using 2.2 ml of 0.921 M triethylaluminum (2.026 mmoles) in hexane and an aliquot of catalyst 3-A containing 0.0098 mmoles of titanium. The cocatalyst Al:Ti ratio was 206:1. The dried reactor contents weighed 473 grams. The melt index, $I_2$, of the polyethylene was 10.8 and the bulk density of the powder was 25.1 lb/ft³ (0.402 g/cc). Catalyst efficiency was 1,008,000 g Pe/g Ti.

C. Polymerization of Ethylene

Ethylene was polymerized according to the manner of example 2-B using 3.2 ml of 0.616 M triisobutylaluminum (1.971 mmoles) in hexane and an aliquot of catalyst 3-A containing 0.0098 mmoles titanium. The cocatalyst Al:Ti ratio was 201:1. The dried reactor contents weighed 425 grams. Melt index, $I_2$, of the polyethylene was 4.23, and the bulk density of the powder was 24.1 lb/ft³ (0.386 g/cc). Catalyst efficiency was 901,000 g PE/g Ti.

I claim:

1. A catalytic product resulting from admixing in an inert hydrocarbon diluent and in an atmosphere which excludes moisture and oxygen
   (A) at least one hydrocarbon soluble organomagnesium material;
   (B) at least one organic alcoholic hydroxyl-containing material;
   (C) at least one reducing halide source; and
   (D) the reaction product or complex formed by mixing at a temperature and for a time sufficient to cause a color change
   (1) at least one transition metal (Tm) compound having at least one hydrocarbyloxy group attached to said transition metal and
   (2) at least one organozinc compound; and wherein
      (a) the components are added in the order (A), (B), (C) and (D) or (A), (B), (D) and (C); and
      (b) the components are employed in quantities so as to provide the following atomic ratios
      Mg:Tm of from about 0.1:1 to about 100:1;
      Zn:Tm of from about 0.05:1 to about 10:1;
      Cl:Mg of from about 2:1 to about 20:1; and
      the OH:total number of hydrocarbyl groups attached to a metal atom in component (A) is from about 0.5:1 to about 1.5:1.

2. A catalytic product of claim 1 wherein
   (1) Component (A) is represented by the formula $R_2Mg \cdot xMeR'_{x'}$ wherein each R is independently a hydrocarbyl group having from 1 to about 20 carbon atoms; each R' is independently a hydrogen, hydrocarbyl or hydrocarbyloxy group having from 1 to about 20 carbon atoms; Me is Al, Zn or B; x has a value from zero to 10 and is sufficient to render the organomagnesium component hydrocarbon soluble; and x' has a value equal to the valence of Me;
   (2) Component (B) is represented by the formulas $R—(O-R')_nOH$ and $Z—O-R')_nO-R'')_{n'}$ wherein each R is a hydrocarbyl group having from 1 to about 20 carbon atoms; each R' is independently a divalent hydrocarbyl group having from 1 to about 20 carbon atoms; each R'' is independently hydrogen or a hydrocarbyl group having from 1 to about 20 carbon atoms, at least one of which is hydrogen; Z is a multivalent organic group containing from 2 to about 20 carbon atoms; n has a value from zero to about 10; and n' has a value of from 2 to about 10;
   (3) component (C) is represented by the formulas $Al(R^3)_{3-m}X_m$ and $B(R^3)_{3-m}X_m$ including mixtures thereof wherein each $R^3$ is independently hydrogen or a hydrocarbyl group as above defined, X is a halogen, and m has a value from 1 to 2;
   (4) component (D-1) is represented by the formula $Tm(OR'')_nX_{z-n}$ or $Tm(OR'')_2O$, wherein Tm is a transition metal in its highest stable valence state and being selected from groups IV-B, V-B and VI-B of the Periodic Table of the Elements; R'' is a hydrocarbyl group having from 1 to about 20 carbon atoms; X is a halogen, preferably chlorine or bromine; z has a value corresponding to the valence of the transition metal, Tm; n has a value of from one to the valence state of the transition metal, Tm;

(5) component (D-2) is represented by the formulae $R_2Zn$ and/or $RZnX$ wherein each R is independently a hydrocarbyl group having from 1 to about 20 carbon atoms and X is a halogen;
(6) the atomic ratio of Mg:Tm is from about 1:1 to about 40:1;
(7) the atomic ratio of Zn:Tm is from about 0.1:1 to about 5:1;
(8) the atomic ratio of Cl:Mg is from about 3:1 to about 15:1; and
(9) the ratio of OH groups in component (B): total number of hydrocarbyl groups attached to a metal atom in component (A) is from about 0.8:1 to about 1.2:1.

3. A catalytic product of claim 2 wherein
(1) in component (A) each R and R' is a hydrocarbyl group having from 1 to about 10 carbons, Me is Al and x has a value of from about 0.2 to about 2;
(2) component (B) is an alcohol having from 1 to about 10 carbon atoms;
(3) component (C) is an aluminum alkyl halide wherein each $R^3$ is independently a hydrocarbyl group having from 1 to about 10 carbons and X is chlorine;
(4) in component (D-1), Tm is titanium;
(5) in component (D-2), the organozinc component is represented by the formula $R_2Zn$ wherein each R is a hydrocarbyl group having from 1 to about 10 carbon atoms;
(6) the atomic ratio of Mg:Tm is from about 5:1 to about 20:1;
(7) the atomic ratio of Zn:Tm is from about 0.2:1 to about 2:1; and
(8) the Cl:Mg atomic ratio is from about 4:1 to about 10:1.

4. A catalytic product of claim 3 wherein
(1) component (A) is butylethylmagnesium.⅓ triisobutylaluminum or dibutylmagnesium.⅓ triisobutylmagnesium;
(2) component (B) is n-propyl alcohol;
(3) component (C) is ethylaluminum dichloride;
(4) component (D-1) is tetraisopropoxytitanium; and
(5) component (D-2) is diethylzinc.

* * * * *

UNITED STATES PATENT AND TRADEMARK OFFICE
CERTIFICATE OF CORRECTION

PATENT NO. : 4,456,547
DATED : June 26, 1984
INVENTOR(S) : Ricardo Fuentes, Jr.

It is certified that error appears in the above—identified patent and that said Letters Patent is hereby corrected as shown below:

Col. 1, line 30; "Perio dic" should be --Periodic--.

Col. 3, line 27; the formula should be as follows:

--R--(O-R')$_n$OH and Z--((O-R')$_n$O-R")$_{n'}$--.

Col. 4, line 55; "hving" should be --having--.

Col. 10, line 41; the second formula should be as follows: --Z--((O-R')$_n$O-R")$_{n'}$--.

Signed and Sealed this

Nineteenth Day of November 1985

[SEAL]

Attest:

DONALD J. QUIGG

Attesting Officer

Commissioner of Patents and Trademarks